No. 837,823. PATENTED DEC. 4, 1906.
F. A. FROHREICH.
DRAFT EQUALIZER.
APPLICATION FILED OCT. 27, 1905.
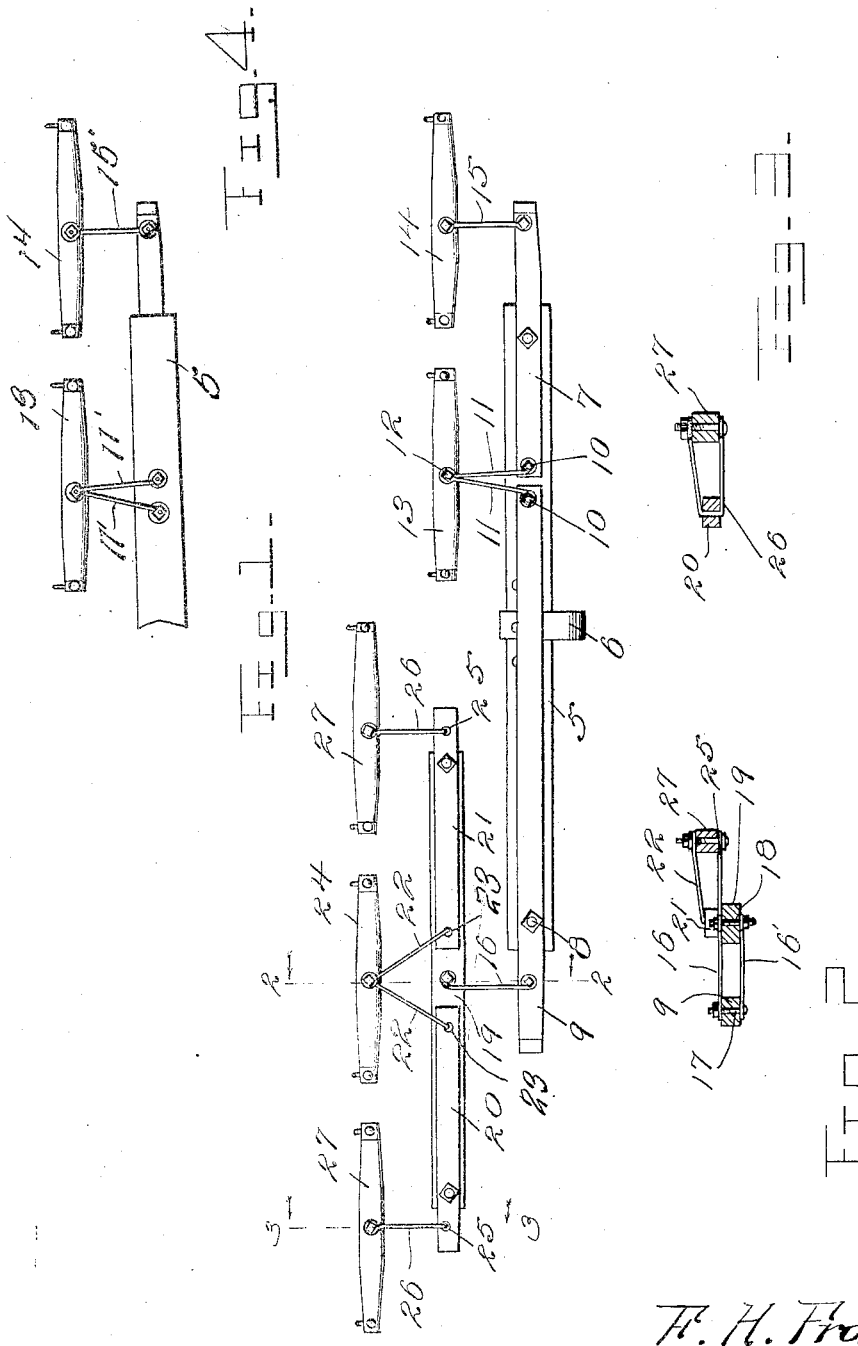
Witnesses
Inventor
F. H. Frohreich
By
Attorneys

UNITED STATES PATENT OFFICE.

FRANK A. FROHREICH, OF GOODLAND, INDIANA.

DRAFT-EQUALIZER.

No. 837,823.  Specification of Letters Patent.  Patented Dec. 4, 1906.

Application filed October 27, 1905. Serial No. 284,685.

*To all whom it may concern:*

Be it known that I, FRANK A. FROHREICH, a citizen of the United States, residing at Goodland, in the county of Newton, State of Indiana, have invented certain new and useful Improvements in Draft-Equalizers; and I do hereby declare the following to be a full, clear, and exact description of the invention, such as will enable others skilled in the art to which it appertains to make and use the same.

This invention relates to draft appliances, and more particularly to draft-equalizers, and has for its object to provide an equalizer for five horses which will be simple in arrangement and which may be manufactured at a low cost.

Other objects and advantages will be apparent from the following description.

In the drawings forming a portion of this specification, and in which like numerals of reference indicate similar parts in the several views, Figure 1 is a top plan view. Fig. 2 is a section on the line 2 2 of Fig. 1. Fig. 3 is a section on the line 3 3 of Fig. 1. Fig. 4 is a fragmentary view showing one end of the equalizer in bottom plan.

Referring now to the drawings, the present invention comprises a main whiffletree 5, having an attaching-yoke 6, in which it is pivoted. A doubletree 7 is pivoted upon the whiffletree 5 adjacent to one end, and adjacent to the other end of the whiffletree there is an upwardly-extending pivot-bolt 8, which is engaged in a lever 9, adjacent to the outer end of the latter, this lever extending inwardly longitudinally of the whiffletree 5 and lying with its inner end adjacent to the inner end of the doubletree 7. Pivot-bolts 10 are engaged in the mutually-adjacent ends of the doubletree 7 and the lever 9, and pivotally engaged with these bolts are the rearward ends of links 11, the forward ends of which have eyes receiving a pivot-bolt 12, carried by a swingletree 13 centrally thereof. The links 11 lie above the just-described portions, and links 11', corresponding to the links 11, are similarly disposed below these portions. A swingletree 14 is connected, by means of upper and lower links 15 and 15', respectively, with the outer end of the doubletree 7 for pivotal movement.

As stated above, the pivot-point of the lever 9 lies adjacent to its outer end, and extending forwardly from the outer end of this lever there are upper and lower links 16 and 16', respectively, engaged at their rearward ends with a pivot-bolt 17, carried by the lever, and at their forward ends with a pivot-bolt 18, carried centrally by a whiffletree 19, disposed forwardly of the lever.

Doubletrees 20 and 21 are pivoted upon the upper surface of the whiffletree 19, the pivot-points of these doubletrees lying adjacent to their outer ends and to the ends of the whiffletree 19.

Yokes 22 have their bights engaged in openings 23, formed vertically in the doubletrees 20 and 21 adjacent to the inner ends thereof, these yokes extending forwardly and receiving between the forward ends of their spaced legs a swingletree 24, which is pivoted to these legs, as shown.

Vertical openings 25 are formed through the doubletrees 20 and 21 adjacent to the outer ends thereof and receive the bights of yokes 26, the spaced legs of which extend forwardly and are engaged above and below swingletrees 27, to which they are connected for pivotal movement of these swingletrees, the latter being thus pivotally connected with the ends of the doubletrees 20 and 21.

It is thought that the operation of the equalizer will be clearly understood without further description.

What is claimed is—

A draft-equalizer comprising a main whiffletree, a doubletree pivoted upon one end of the whiffletree, upper and lower links pivoted to the outer end of the doubletree and extending forwardly therefrom, a swingletree pivoted between the forward ends of the links, a lever disposed upon the whiffletree and pivoted adjacent to its outer end to the whiffletree, said lever lying with its inner end adjacent to the inner end of the doubletree, upper and lower links carried by the mutually-adjacent ends of the doubletree and lever, a swingletree pivoted between the forward ends of said links, upper and lower links pivoted to the outer end of the lever, a second whiffletree pivoted between the forward ends of the just-named links, doubletrees pivotally connected with the second-named whiffletree adjacent to the ends thereof, the pivot-points of said doubletrees lying adjacent to their outer ends, said second-named doubletrees having vertical openings formed through their ends, yokes having their bights engaged in the openings and lying with their spaced legs extending forwardly, swingletrees pivoted in the yokes at the ends of the second-named doubletrees, and a swingletree pivoted between the forward ends of the spaced legs of the yokes at the inner ends of the second-named doubletrees.

In testimony whereof I affix my signature in presence of two witnesses.

FRANK A. FROHREICH.

Witnesses:
A. D. BOBCOCK,
LEWIS C. WHITEMAN.